Sept. 2, 1969  E. C. OKRESS  3,464,207
QUASI-CORONA-AERODYNAMIC VEHICLE
Filed Oct. 10, 1966
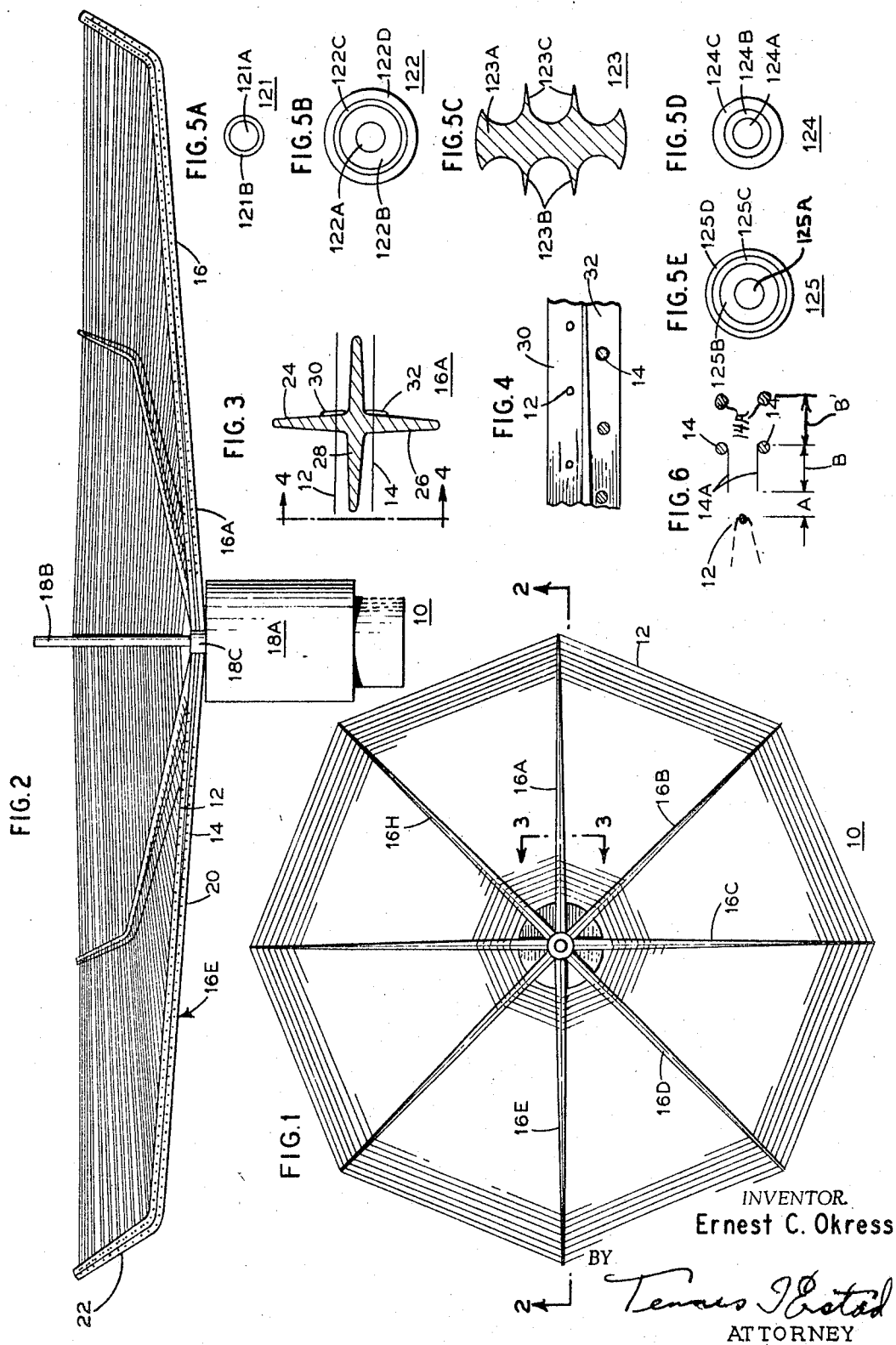
INVENTOR.
Ernest C. Okress
BY
ATTORNEY United States Patent Office 3,464,207
Patented Sept. 2, 1969

3,464,207
QUASI-CORONA-AERODYNAMIC VEHICLE
Ernest C. Okress, Elizabeth, N.J., assignor to American Standard Inc., a corporation of Delaware
Filed Oct. 10, 1966, Ser. No. 585,661
Int. Cl. H05h 1/18; H01j 1/05
U.S. Cl. 60—202                                    33 Claims

ABSTRACT OF THE DISCLOSURE

This invention relates to electroaerodynamic systems for the propulsion of vehicles through a gaseous dielectric atmosphere. Pulses of sufficient energy are produced for ionizing gas molecules in the dielectric atmosphere. The pulses are of sufficiently short duration so as not to break down the medium electrically. The amplitude of the pulses should be as large as possible and their duration as short as possible so as to transfer a maximum amount of energy per pulse to the gas. One of the features of the invention is the employment of a periodic ionizing electric field.

---

This invention pertains to electroaerodynamic propulsion of aerospace vehicles capable of hovering or moving in any direction in a gaseous dielectric atmosphere at any altitude, and more particularly, to a non-mechanical, electric levitating and maneuverable aerospace vehicle.

When ions and electrons move through a gas under the influence of an electric field, they collide with the gas molecules, and essentially the ions, because of their comparable collision cross section with gas molecules, impart momentum to them. The result is a pressure gradient in the gas or a flow or both. The flow of gas by such means is referred to as "electric wind." A practical means of generating such "electric wind" is by means of the normal constant or direct current (D.C.) corona discharge in air.

On this phenomena, as a basis, there have been proposed aerospace vehicles dependent for their thrust, for hovering and moving. One such vehicle contemplates establishing a normal D.C. corona discharge by application of a suitable electric field, below the complete electric breakdown limit of about 30 kilovolts (kv.)/centimeter (cm.) at N.T.P. air, between a grid of preferably negative polarity electric charge emitter electrodes and a suitably disposed grid of positive electric charge polarity collector electrodes, below the former. The resulting downward electric wind, generated by the corona, provides the vertical thrust component required for hovering and movement in any direction, by orienting the same, by energizing a complementary corona system.

Although scaled-down small laboratory models of this vehicle have worked, it is doubtful that practical and commercially successful versions of these vehicles are realizable, because practical vehicles require much higher efficientcy and electric current and much higher specific weight (i.e., power/unit weight), therefore, the required thrust is considerable and is not achievable by this prior art means for reasons which will be evident by the reading of this subsequent text.

The input electrical energy in a normal D.C. corona discharge is converted mainly into heat in the gas, in the sense that the ions impart their momentum to the gas molecules. However, only a relatively small fraction of the input energy is converted into light, a comparable portion into chemical energy and the bulk of the remainder into heat as defined. As a matter of fact, the normal D.C. corona discharge in air creates more excited molecules, dissociating into free radicals, and ozone and nitrogen compounds than ions, for while the ions disappear by recombination, the ozone and nitrogen compounds do not.

Furthermore, the aerodynamic pressure gradient which the electric wind can develop by the normal D.C. corona discharge in air at normal temperature and pressure is proportional, in part, to the square of the electric field, applied between the — (or +) point emitter and + (or —) plane collector. When an applied voltage just below that at which said electric breakdown occurs at about 15 kv. between assymmetrical electrodes in dry air at normal temperature and pressure, the upper limit of the aerostatic pressure gradient, assuming nominal efficiency, is about ¼ pound per square foot. Therefore, an electrode array having an area in thousands of square feet is required to obtain thrusts of hundreds of pounds. The required area increases much more when it is realized that the normal efficiency of the order of a percent is obtainable with the normal D.C. corona discharge in air at atmospheric conditions.

Since the aerodynamic pressure increases with the square of the applied voltage, the supposedly obvious solution to the problem would be to increase the applied D.C. voltage. However, if the voltage is increased much beyond breakdown stream initiation, as previously cited, the discharge can no longer do useful work, resulting in the supplied energy being wasted. Therefore, there is a limit to the applied voltage (i.e. ~30 kv./cm.) to such a D.C. corona type electric wind generator. Consequently, there is also a limit to the amount of constant input energy to such a corona discharge (e.g. ~ watt./cm.³). In other words, the constant or D.C. electric breakdown voltage limit and the constant or D.C. input energy or power limit, prematurely limit the useful work capability of constant or D.C. electric energy input into the air via the normal D.C. corona, to such a low level as to challenge the practical application of D.C. corona phenomena to levitation vehicles. Furthermore, normal D.C. corona results in erosion of the electrodes, thus limiting their life as well.

In addition to these electrical limitations, there is also a health hazard. As previously discussed, the normal D.C. corona operating in air generates copious toxic ozone, oxozone and the even more toxic oxides of nitrogen more copiously than the desired ions. Furthermore, unlike the ions, these toxic compounds do not decay. Incidentally, it should be noted that ozone in concentrations of 8 parts per million, within 5 to 10 minutes produces as many chromosome breakages as 200 roentgen dose of X-rays.

Furthermore, when using a normal D.C. corona electric wind device the generated pressure gradient increases asymptotically with the velocity of the vehicle. This asymptotic increase may cause instability of the pressure gradient leading to unreliable operation of the vehicle.

It is hence a general object of the invention to provide significantly improved aerospace electrical propulsion for an aerospace vehicle.

It is another object of the invention to significantly increase the aerodynamic pressure per unit area and hence the propulsion force/unit area for electroaerodynamic vehicles.

It is a further object of the invention to provide a more efficient electric wind propelled aerospace vehicle than present state of art devices which rely upon normal D.C. or continuous wave (C.W.) discharge means.

It is yet another object of the invention to provide an improved electric wind propelled aerospace vehicle which can develop aerodynamic pressures of several orders of magnitude per unit state greater than present state of art devices which rely on normal D.C. or C.W. corona discharge means.

It is yet still another object of the invention to provide a significantly improved aerospace electrical vehicle, or significantly increase the efficiency of aerodynamic pressure generation and aerodynamic pressure per unit area and hence the propulsion force per unit area, by utilizing an improved electric charge emitter.

It is another object of the invention to satisfy the foregoing objectives and provide an aerospace electric vehicle of the type described which reduces the danger to the health of human beings in contrast with prior art normal D.C. or (C.W.) corona means.

It is an environmental object of the invention to provide such an aerospace electric vehicle which reduces the generation of toxic substances including ozone and nitrogen compounds.

It is a specific object of the invention to provide in an aerospace electric vehicle significantly improved electroaerodynamic means for imparting momentum to the surrounding air to obtain orders of magnitude more effective direct electric propulsion, maneuvering, hovering or levitation of the vehicle without there being an initiation of breakdown streamers which ultimately bridge the electrodes at the electric breakdown limit.

Briefly, the invention contemplates propelling an aerospace vehicle in a dielectric medium of gas molecules such as air by periodically applying sufficient energy pulses to electrodes for ionizing a portion of the gas molecules. The pulses are of sufficiently short duration so that the medium does not completely break down electrically. The amplitude of the electric field pulses should be as large as possible and duration as brief as possible in order to transfer the maximum amount of energy/pulse to the gas. Unipolar charges are generated and are accelerated between asymmetric electrodes. Such unipolar ions with comparable collision cross sections of that of gas atoms then collide with neutral molecules of the medium along the electric field lines to develop the propelling thrust.

Other objects, features and advantages of the invention will in part be obvious and will in part appear hereinafter.

The invention, accordingly, comprises the features and arrangements which are exemplified with respect to a particular combination of elements while the scope of the invention will be indicated in the claims.

For a further understanding of the nature and objects and advantages of the invention, reference should be made to the following detailed description read in connection with the accompanying drawings, in which:

FIG. 1 shows a top plan view of a single stage parallel array quasi-corona propulsion means for an aerospace vehicle in accordance with the invention wherein a portion of the wires acting as asymmetrical electrodes have been deleted;

FIG. 2 is a sectional view of the vehicle taken along the line 2—2 of FIG. 1;

FIG. 3 is an enlarged sectional view of one of the spokes supporting the wires taken along the line 3—3 of FIG. 1;

FIG. 4 is an enlarged side view of the spoke as viewed from the line 4—4 of FIG. 3;

FIGS. 5A–5E show enlarged cross-sectional views of various charge emitter electrodes; and FIG. 6 shows a schematic sectional view of the electrodes according to another embodiment of the invention.

The invention involves essentially an array of asymmetric cold (—) or (+) charged emitter and (+) or (—) charged collector electrodes respectively. The asymmetric electrodes are appropriately disposed and energized by maximum periodic (e.g., order of myriapulses per second to lakhpulses per second), maximum voltage (e.g., order of lakhvolts), minimum duration (e.g., order of nanosecond) pulses in order to transfer the maximum average power or energy/pulse into the quasi-corona discharge so as to cause maximum current (e.g. hectoamperes) between the asymmetrical electric field electrodes, but not to cause complete or low impedance electric breakdown of the air by spark streamer formation between the electrodes, regardless of the amplitude of the applied pulse voltage at least up to the indicated value in air at N.T.P.H.

The quasi-corona electric wind or aerodynamic pressure or propulsion force, resulting from each asymmetric electrode-pair arises from a not completely known mechanism, even for the heretofore known normal D.C. corona embodiment of unipolar ion conduction. However, to the extent that the mechanism is known, the following applies:

Since only electric charges can interact directly with an electric field, between electrodes, in response to applied voltage, a means must exist for the transfer of kinetic energy from charges to the neutral gas particles. Otherwise, the directed momentum transfer and energy conversion efficiency suffer since most of the kinetic energy in the gas is carried by the accelerated electric charges. Furthermore, energy transfer can only occur by virtue of electric attractive forces and collisions between particles. The electric charges, ions and electrons, in absorbing their energy from an external electric source via the electrodes, are accelerated. To realize high conversion efficiency the gas or air of essentially neutral atoms and molecules must be accelerated correspondingly by absorbing energy from the electric charges. This energy transfer mechanism arises essentially from the electrons, derived from the emitter, which when subject to appropriate high electric gradients experience large accelerating forces. However, the electron's mass is relatively low so that in the absence of energy transfer to positive ions and neutral atoms and molecules, the electrons would be effectively removed from the inter-action space at the collector electrodes. However, the negative charge cloud of electrons accelerated toward the collector electrodes exert attractive electric forces on the positive ions contributing to their acceleration, which because of their relatively huge mass are only correspondingly less accelerated by the applied electric field. Thus the positive ions, in the absence of energy transfer from neutral atoms and molecules other than electric forces can be effectively bunched as in the case of the electrons. There is thus created dense ionization clouds of positive ions and electrons which can exert accelerating forces on the neutral atoms and molecules via efficient energy transfer by direction (i.e., momentum transfer, directed along an electric axis) collisions between neutral gas particles and essentially ions, on account of their comparable masses in contrast to that of electrons. Hence, the gas stream is pushed forward by the ion cloud by virtue of the electric charges being forced through the gas in response to the applied electric field, thus also replenishing those electric charges during collisions with molecules while they themselves are accelerated. The net effect is an electric wind at the expense of absorption of the applied electric energy across the asymmetric electrodes.

This energy transfer mechanism may be compared with that in a solid in which the energy transfer occurs via the positive ions in the crystal lattice. The conduction electrons, contributed by the atoms of the solid, flowing (or induced by virtue of motion in a magnetic field) in response to the applied electric gradient, experience a retarding force communicated to the positive ions due to Coulomb attractive forces. However, in the case of a solid, the positive ions are relatively fixed in the crystal lattice and hence the whole conductor alters kinetic energy. Such a process arises from the fact that the atoms, which contribute the conduction electrons, are closely packed and tied to their sites in a solid so that interparticle electric forces are great.

As previously mentioned, the normal D.C. corona discharge is limited in the amount of energy or power which can be induced into it. One limitation is the complete electric breakdown voltage in air at atmospheric pressure, temperature and humidity (i.e., $\sim$ 30 kv./cm.). The other limitation is the constant applied voltage. Consequently, the current density (e.g., $\sim$ 100 ma./ft.$^2$) and power density (e.g., less than 1 kw./ft.$^2$) are limited to low values. Hence the generated unipolar ion aerodynamic pressure, as previously described is correspondingly low (e.g., $\sim$ 0.07 to $\sim$ 0.35 lb./ft.$^2$ of $\sim$ 0.4 to $\sim$ 2 mm. H$_2$O, respectively). The efficiency, electrical and aerodynamic pressure-wise, is also low.

To significantly improve the amount of energy or power which can be driven into ionized gas discharge in air at atmospheric conditions and thus form a quasi-corona, it is necessary at least, to apply to asymmetric electrodes as high a voltage as possible for as brief a period as possible before the accumulative effects of these parameters initiate spark streamer in the quasi-corona discharge and so waste the input power or energy. During the pulse, the quasi-corona discharge possesses a relatively large degree of non-thermal ionization (i.e., high electron temperature relative to gas temperature). The persistence of this state is appreciable only for sub-atmospheric pressure monatomic gases of high electron mobility and relatively low recombination coefficient. In the case of diatomic and polatomic molecules at atmospheric pressure, the duration of the non-equilibrium state or electron temperature and resulting ionization is extremely brief, due to energy absorption in ionizaton, and excitation of molecules (which are unstable and decompose spontaneously into free radicals). In other words, as previously mentioned, the electrical energy is mainly converted into "heat" in the gas in that the ions impart their directed momentum to molecules, under the influence of the electric field, resulting in an aerodynamic pressure gradient or flow or both along the common axis or plane of the system.

The maximum aerodynamic pressure generation depends essentially on the maximum electric field strength feasible. Furthermore, since the initial carrier mobility (i.e., in the emitter or dipolar region) is more than later in life; under constant current, the voltage drops and is less than at high electric field so that the emitter region, with higher carrier mobility, presents less resistance. Hence, the aerostatic pressure rises more than the square of the applied voltage or electric field. Under constant current operation, the pressure is inversely proportional to the stream velocity resulting in a stable system. In the dynamic case, for constant pressure, the electric current is proportional to the stream velocity. The magnitude of the ratio of the aerodynamic pressure with respect to the aerostatic pressure is limited by aerodynamic friction, causing non-linear fluctuations of pressure and current.

With regard to the constant voltage case, aerodynamic pressure generation is directly proportional to the square of the applied voltage and electric field strength at the charge collector. In the case of the D.C. or A.C. corona the complete electric breakdown voltage is limited to the order of 15 kv. (i.e., 30 kv./cm.). With quasi-corona at $\sim$2 nanosecond duration, $\sim$150 kv. (i.e. $\sim$300 kv./cm.) and $\sim$10 kilopulses/second (advanced pulse generator technology) a system can be sustained without complete electric breakdown. Thus, at least a ten-fold increase in electric field and twenty-five-fold increase in aerodynamic pressure generation accrues in contrast to D.C. or A.C. corona means. To illustrate this assertion, consider that a D.C. corona at pre-breakdown (i.e., threshold of streamer formation and bridge) corresponding to $\sim$28 kilovolts at NTP air (without additatives) may, constrained (i.e. dielectric skirt) develop $\sim$0.5 lb./ft.$^2$ or $\sim$2 mm. H$_2$O aerostatic pressure. Without constraint, the aerostatic pressure is lower (e.g., 0.1 to 1.0 mm. H$_2$O). In contrast, a quasi-corona operating at the prevailing pulse generator technology (e.g. $\sim$100 kilovolts, $\sim$2 nanoseconds, $\sim$1 myriapulses/second) may produce up to $\sim$30 lb./ft.$^2$ or $\sim$144 mm. H$_2$O aerostatic pressure, which is not its upper limit. In other words, quasi-corona at $>$100 kv. is capable of generating about two orders of magnitude higher aerostatic pressure and this is by no means the limit theoretically or practically.

The advantage accruing from series or parallel or compound quasi-corona and normal D.C. or C.W. corona systems alike are not without their restrictions, however, they are much less severe in the case of quasi-corona operation.

With regard to parallel units, the accumulative feedback between units, at the same voltage, may be reduced by minimizing the interaction between them. Otherwise, the unit of higher pressure generation capability surpasses the weaker one and deprives it from contributing its potential share to the system, and the more effectively the higher essentially the carrier mobility. Although, the effect of relatively small physical differences between units is mitigated to a tolerable degree at relatively high applied voltage, still the system efficiency of pressure generation is somewhat smaller than that of the best unit. Hence, the units must be uniform and precise structurally and physically. Under constant applied voltage the system (or parallel) stream flow rate or electric current is simply the product of the unit stream flow rate or unit electric current respectively and the number of units, presuming negligible interaction between units. In either case, the efficiency of pressure generation remains constant as for a unit.

With regard to series units, the uniformity requirements between units is mitigated. Under constant current, the system (or series) pressure generation or voltage is simply the product of the unit pressure generation or unit voltage, respectively, and the number of units. In either case, the efficiency of pressure generation remains constant as for a unit. Since the aerodynamic pressure generation is proportional to the stream velocity, if it is not attenuated in aerodynamic friction loss, then the latter stages of the series system will develop higher aerodynamic pressure increments than the former, since the incident stream velocity, derived from the preceding series stages, is higher.

Referring now to FIGS. 1 and 2, an aerospace vehicle 10 is shown comprising two pluralities of wire electrodes 12 and 14 supported by dielectric spokes 16. Wire electrodes 12 (electric charge emitter electrodes) lie above wire electrodes 14 (unipolar or alternating polarity, provided that the transit time of unipolar ions between electrodes is less than the applied voltage pulse duration). Dielectric spokes 16 radiate from a hub section. The hub section supports a source of unipolar (or alternating polarity) voltage pulses 18 which includes a primary source of electric energy 18A, a pulse generator capable of generating periodic nanosecond lakhvolt pulses at lakhpulses per second 18B, and a pulse distributor 18C. The primary source of electrical energy 18A energizes the unipolar or alternating polarity voltage pulse generator 18B.

The voltage pulses are fed via distributor 18C to the wire electrodes 12 and 14 so that a periodically occurring pulsed properly polarized electric field is developed across the electrodes. The polarity of the voltage pulses applied across electrodes 14 is such that they act as accelerator of unipolar ions derived from the vicinity of electrodes 12, causing the above described pulsed electric wind or acceleration of the gas molecules.

Alternately, in contrast to the diode electrode configuration described, a triode electrode configuration (not shown) may be utilized for further enhancement of areodynamic pressure or thrust at the disadvantage of added complication. This configuration comprises interposing like electrode 14 in proximity of electrodes 12. Across electrodes 12 and these intermediate electrodes (not shown) is impressed sufficient periodic pulse voltage to create the quasi-corona. The intermediate electrodes are polarized so that unipolar (or alternating unipolar) ions are ejected between the intermediate electrodes and electrodes 14, which the latter accelerates, by virtue of high periodic pulse voltage applied between the intermediate electrodes and the electrodes 14. The pulse duration and repetition rate is such, in all cases, that complete or low impedance electric breakdown of the gas does not occur.

More particularly, primary source of electrical energy may take many forms. It may be solar energy cells of the photovoltaic or thermoelectric type. It may be thermionic or dynamic converter. It may be a (H—O) fuel cell. Nuclear thermoelectric or thermionic reactors such as the presently available Atomic Energy Commission SNAP reactors can be employed. For sufficiently near ground hovering operations, ground stationed, highly directional microwave transmissions can be aimed at the vehicle equipped with microwave dipole semiconductor rectifier (rectenna) antenna.

A pulse generator 18B capable of generating unipolar and preferably alternating polarity voltage pulses having an amplitude of from about 25 to about 100 or preferably 150 or more kilovolts at a repetition rate of from about 1,000 to about 10,000 or more pulses per second. The pulse duration should be of the order of a nanosecond with rise and fall times of about a third or less of the pulse duration. Such a pulse generator already under development is based on a prototype described in the following article: D. F. McDonald, et al., "Subnanosecond Risetime Multikilovolt Pulse Generator," Review of Sicentific Instruments, vol. 36, No. 4, April 1965, p. 504.

The pulse distributor 18C may be a suitable high voltage switch which connects the output of the pulse generator 18B to the electrodes such as 12 and 14.

Spokes 16 are made of reinforced hollow dielectric material which has high structural rigidity and minimum weight. A suitable material is epoxy impregnated glass fibers. Each spoke radiates from the hub section and includes a first length section 20 which is disposed substantially horizontally. In order to improve aerodynamic stability, length sections 20 are provided with a positive dihedral. Integral with and extending angularly upward from length section 20 is a second length section 22.

To reduce surface electric charging, the dielectric spokes are coated with a suitable material, such as Teflon.

In order to add to the structural rigidity of spokes 16, they are provided with a cruciform cross-section (see FIG. 3). In cross-section each spoke 16 has an upright section including an upper portion 24 and a lower portion 26 separated by a crossing section 28. Fixed to upper portion 24 is an electrically conductive strip 30 which extends longitudinally along the length of spoke 16. Similarly fixed to lower portion 26 is another electrically conductive strip 32 which extends longitudinally along the length of spoke 16. One output terminal of pulse generator 18B is connected via pulse distributor 18C to electrically conductive strips 30; the other (positive) output terminal of pulse generator 18B is connected via pulse distributor 18C to electrically conductive strips 32. Accordingly, during each voltage pulse, strip 32 is driven positive with respect to strip 30. The strips 30 and 32 provide electrical connection for the wire electrodes 12 and 14 respectively. It should be noted that crossing section 28 also provides added electrical insulation between the strips.

The load impedance comprising the wires and conducting strips and dielectric are such as to be matched to the pulse generator impedance.

As shown in FIG. 4, each of the wire electrodes (emitter electrodes 12) is connected to conductive strips 30 while each of the wire electrodes (collector electrodes) 14 is connected to conductive strips 32. Thus, at least along the first length sections 20 wire electrodes 12 are disposed above wire electrodes 14 and by virtue of the polarity of the voltage pulse as indicated in FIG. 4 there is a downward acceleration of ions. This downward movement of ions causes a downward propulsion of neutral gas molecules by virtue of ion-molecule collisions described previously. This results in an upward reaction thrust of the vehicle 10. Accordingly, the wire array associated with the length section 20 is the vertical propulsion area of the vehicle.

Lateral propulsion can be provided by the wire array associated with length sections 22. In order to provide controllably directive lateral propulsion the conductive strips of adjacent pairs of spokes are selectively energized. For example, distributor 18A may include selective switching means wherein all of the conductive strips but those of a selected pair of spokes 16 are connected to pulse generator 18B. In particular, to move to the right, as shown in FIG. 1, distributor 18B connects the conductive strips of all spokes except spokes 16C, 16B 16A, 16H and 16G to the pulse distributor 18B. The vertical thrust is diminished somewhat but a lateral thrust component is intrdouced. It will be noted that the wire arrays associated with length sections 22 (FIG. 2) radially outward, accelerate gas molecules resulting in radially inward directed thrusts. If all the conductive strips are energized the resultant lateral thrust is zero. However, for the example given, the wire array between spokes 16C, 16B, 16A, 16H and 16G are not energized. Accordingly, the portion of this wire array associated with its length section 22 generates no thrust. Hence, there is a resultant lateral thrust in a direction along the bisector of the angle between spokes 16D and 16F. In this manner, lateral thrust in any direction may be developed.

In order to enhance electron emission, the emitter electrodes can take the various forms shown in FIG. 5. In FIG. 5A, the emitter 121 is shown as a wire having a tungsten core 121A. Plated thereon is a surface 121B of platinum having a thickness in the order of 100 A. (angstrom unit) to act as an electron emitter. If a plating of platinum or iridium black is employed then there is obtained an emission of ions.

The emitter 122 of FIG. 5B is a wire having a core of tungsten or quartz 122A. Disposed about the core is a substrate 122B of aluminum having a thickness of about 1500 A. On the substrate is an insulating film 122C of aluminum oxide which is about 90 A. thick. On the insulating film is a charge emitter metal film 122D such as gold with thickness in the order of 150 A.

FIG. 5C shows an emitter 123 for field ion emission. Emitter 123 has a core 123A of tungsten wire having tipped sides 123B that are tipped with platinum. The points 123C of the tips are provided with a 5 to 10 micron radius of curvature and a hyperbolic contour.

A radioactive emitter 124 is shown in FIG. 5D having: a core 124A of tungsten or quartz; a radioactive charge source 124B of tritium, radium D etc.; and a permeable ion or electron film 124C of gold having a thickness of about 100 A.

In FIG. 5E, there is shown a photoelectric (tunnel) emitter 125 operating at a wavelength of less than 2000 A. Emitter 125 comprises: a core 125A of tungsten or quartz; a substrate 125B of copper having a thickness of at least 1000 A.; a charge emitter 125C in the form of a layer silver about 100 A. thick; and a permeable film 125D of gold about 100 A. thick.

In order to increase the efficiency of the electrodes by minimizing any lateral pressure distribution resulting from a lateral current flow which may result in the generation of eddies a dielectric skirt may be used. Accordingly, each collector electrode 14 is provided with a dielectric skirt 14A, acting as a dielectric constrictor, extending toward and laterally displaced from an emitter electrode 12. (See FIG. 6.) Thus, the space between the electrodes is divided into two axially displaced regions A and B. Region A is a bipolar conduction region and region B a unipolar conduction region.

There has thus been shown an improved aerospace vehicle which by utilizing a (periodically pulsed) quasi-corona as defined generates high energy unipolar or alternating polarity ions to efficiently propel neutral gas molecules for generating aerodynamic thrust to move an aerospace vehicle in any direction and at any altitude and range. The utilization of a (periodic pulsed) quasi-corona as defined increases the thrust/unit area capability by at least two orders of magnitude over conventional D.C. or A.C. corona type electric wind propelled aerospace vehicles.

It will thus be seen that the objects set forth above, among those made apparent from the preceding description, are effectively attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. The method of levitating and propelling a vehicle in any direction in a dielectric medium of gas molecules which consists in generating and applying a pulsed electric field to spaced asymmetrical electrodes supported on said vehicle, said electric field being in the order of nanosecond, lakhvolt, myriapulses per second to cause hectoamperes flow between said spaced asymmetric electrodes on the vehicle for inonizing a portion of the gas molecules, said electric field being sufficiently short in duration so that the gas medium is not electrically broken down into spark streamers, and causing the unipolar electric charges so formed to be accelerated between said spaced asymmetrical electrodes and to collide with molecules of the medium in a directed and controlled manner so as to urge the gas molecules essentially forward of the ion flow along the applied electric field axis.

2. The method of claim 1 wherein the applied electric field is unipolar pulsed.

3. The method of claim 1 wherein the applied electric field is alternatively polarity pulsed, the pulses having durations less than the transit time of ions between the electrodes.

4. The method of levitating and propelling a vehicle in any direction in a dielectric medium of gas molecules which consists in periodically applying voltage pulses to spaced electrodes on the vehicle, said voltage pulses having a maximum amplitude and minimum duration to maximize the energy per pulse input to the gas and said voltage pulses having a maximum repetition rate to maximize the power input to the gas to maximize the ionization of the gas molecules so as to cause a maximum ion current flow and a minimum of displacement current flow an dhaving a duration of no longer than that required to prevent the medium from electrically breaking down in spark streamer and causing the unipolar ions so formed to be accelerated between said electrodes and to collide with molecules of the medium in a directed and controlled manner so as to urge the gas molecules essentially forward of the ion flow along the applied electric field axis.

5. A vehicle for flying in air comprising, in combination with said vehicle, a plurality of electric charge emitter electrodes, a plurality of electric charge collector electrodes, means for supporting said emitter electrodes in spaced and oriented relation from said collector electrodes, and means for applying periodic spaced voltage pulses between said emitter and collector electrodes for ionizing a portion of the air molecules to cause unipolar ions to move toward said collector electrodes whereby unipolar ions collide with neutral air molecules to produce a directed propulsive force for propelling the vehicle through air.

6. The vehicle of claim 5 wherein each of said electric charge emitter electrodes comprises a core of support material and charge emitting material on said core.

7. The vehicle of claim 5 wherein each of said electric charge emitter electrodes comprises a core of support material and a layer of charge emitting material on said core.

8. The vehicle of claim 5 wherein each of said electric charge emitting electrodes comprises a core of tungsten and a layer of charge emitting material on said core.

9. The vehicle of claim 5 wherein each of said electric charge emitter electrodes comprises a core of tungsten and a layer of platinum on said core.

10. The vehicle of claim 5 wherein each of said electric charge emitter electrodes comprises a substrate, an insulator film on said substrate, and a charge emitter film on said insulator film.

11. The vehicle of claim 5 wherein each of said electric charge emitter electrodes comprises a substrate of aluminium an insulator film on said substrate and a charge emitter film on said insulator film.

12. The vehicle of claim 5 wherein each of said electric charge emitter electrodes comprises a core of tungsten, a substrate of aluminium on said core, an insulator film of an oxide of aluminium on said substrate, and a charge emitter film of gold on said insulator film.

13. The vehicle of claim 5 wherein each of said electric charge emitter electrodes comprises a core including a plurality of pointed projections having ends, each of said ends being covered with platinum.

14. The vehicle of claim 13 wherein said core is made of tungsten.

15. The vehicle of claim 14 wherein each of said ends is a tip.

16. The vehicle of claim 14 wherein each of said ends is an edge.

17. The vehicle of claim 5 wherein each of said electric charge emitter electrodes comprises a core, a layer of a radioactive charge source on said core and a permeable charged particle film on said layer.

18. The vehicle of claim 17 wherein said core is tungsten and said film is gold.

19. The vehicle of claim 18 wherein said charge source includes tritium.

20. The vehicle of claim 18 wherein said charge source includes radium D.

21. The vehicle of claim 5 wherein each of said electric charge emitting electrodes comprises a core, a substrate of an electrically conductive material on said core, a layer of charge emitter material on said substrate, and a charge permeable film on said layer.

22. The vehicle of claim 5 wherein each of said electric charge emitting electrodes comprises a core of tungsten, a substrate of copper on said core, a layer of silver on said substrate, and a film of gold on said layer.

23. The vehicle of claim 5 further comprising a dielectric skirt extending from each collector electrode axially toward an emitter electrode.

24. A vehicle for flying in air comprising a plurality of electric charge emitter electrodes, a plurality of electric charge collector electrodes, means for supporting said emitter electrodes in an open small aerodynamic friction planar array, means for supporting said collector electrodes in an open low aerodynamic friction planar array and spaced and oriented from said emitter electrodes, and means for applying periodic pulses of voltage between said emitter and collector electrodes for ionizing a portion of the air molecules without low impedance electric breakdown of the gas across the electrodes to cause the ions to move essentially along the electric field lines toward said collector electrodes whereby the ions collide with air molecules to produce a propulsive force for the vehicle.

25. The vehicle of claim 24 wherein said supporting means are of a dielectric material coated with a noncharging material.

26. A vehicle for flying in air comprising a plurality of electric charge emitter electrodes, a plurality of electric charge collector electrodes, means for substantially horizontally supporting a first portion of said emitter electrodes in an open planar array of low aerodynamic friction and second portion of said emitter electrodes along an open surface array of low aerodynamic friction angularly disposed with respect to said open planar array and for supporting a first portion of said collector electrodes in said open planar array spaced and oriented opposite said first portion of said emitter electrodes and a second portion of said collector electrodes in an open surface array of low aerodynamic friction opposite the second portion of said emitter electrodes and means for applying periodic pulses of voltage to said emitter electrodes with respect to said collector electrodes for ionizing a portion of the air molecules without low impedance electric breakdown of the gas across the electrodes to cause the unipolar ions to move along the electric field lines toward said collector electrodes whereby the said ions collide with air molecules to produce a propulsive force for the vehicle.

27. A vehicle for flying in air comprising a hub section, a source of periodically occurring voltage pulses disposed in said hub section, a plurality of spokes of dielectric material radially extending from said hub section, each of said spokes including an upper portion and a lower portion, a plurality of electric charge emitter electrodes extending between adjacent spokes and supported by one of the portions thereof, a plurality of electric charge collector electrodes extending between adjacent spokes and supported, spaced and oriented from the emitter electrodes by the other portions of said spokes, and means for connecting said source of periodically occurring voltage pulses to said electrodes so that some of the air molecule in proximity with said emitter electrodes are ionized to unipolar ions accelerated along electric field lines to said collector electrodes and directionally collide with air molecules to provide aerodynamic thrust for the vehicle.

28. A vehicle for flying in air comprising a hub section, a source of periodically occurring voltage pulses disposed in said hub section, a plurality of spokes of dielectric material radially extending from said hub section, each of said spokes including an upper portion and a lower portion, a plurality of first wires extending between adjacent spokes, means associated with one portion of each of said spokes for supporting said first wires in mutually spaced and oriented relationship, a plurality of second wires extending between adjacent spokes, means associated with the other portion of each of said spokes for supporting said second wires in mutually spaced and oriented relationship and also spaced from said first wires, and means for connecting said source of said periodically occurring voltage pulses between said wires so that some of the air molecules in proximity with said first wires are ionized and unipolar ions accelerated to said second wires and directionally collide with air molecles to provide aerodynamic thrust for the vehicle, both functions realized without encountering low impedance breakdown of the gas between the electrodes.

29. The vehicle of claim 28 wherein each of said spokes may have a cruciform cross-section including four arms said first wires being supported by one of said arms and said second wires being supported by another and opposite arm and said remaining two arms being disposed between said one and said another arms.

30. The vehicle of claim 28 wherein each of said spokes has a cruciform cross-section including four arms and further comprises a first electrically conductive strip on one of said arms and extending longitudinally along each of said spokes, a second electrically conductive strip on another and opposite arm and extending longitudinally along each of said spokes, said remaining two arms being disposed between said one and other arms, said first wires being supported by said one arm and connected to said first conductive strip and said second wires being supported by said other arm and connected to said second conductive strip.

31. A vehicle for flying in air comprising a hub section, a source of periodically occurring voltage pulses disposed in said hub section, a plurality of spokes of dielectric material radially extending from said hub section, each of said spokes including a first length section disposed substantially horizontally and a second length section angularly extending from the first length section, each of said spokes further including an upper portion and a lower portion, a plurality of electric charge emitter electrodes extending between adjacent spokes and supported by one of the portions thereof, a plurality of electric charge collector electrodes extending between adjacent spokes and supported spaced from the emitter electrodes by the other portions of said spokes, and means for connecting said source of periodically occurring voltage pulses to said electrodes so that some of the air molecules in proximity with said emitter electrodes are ionized and unipolar ions accelerated along electric field lines between said electrodes to said collector electrodes and collide with air molecules to provide aerodynamic thrust for the vehicle, both functions realized without encountering low impedance breakdown of the gas between the electrodes.

32. The vehicle of claim 31 wherein the first length section of the spokes have a positive dihedral and the second length sections extend angularly upward from the first length sections respectively.

33. A vehicle for flying in air comprising: a hub section; a source of periodically occurring voltage pulses disposed in said hub section; a plurality of spokes of dielectric material radially extending from said hub section, each of said spokes including a first length section extending from said hub section in substantially horizontal orientation and a second length section extending upwardly from said first length section and substantially parallel to the axis of said hub section, each of said spokes having a cruciform cross-section and four arms, in said first length section one of said arms being upwardly extending, another of said arms being downwardly extending and the two remaining arms being horizontal, a first electrically conductive strip on said upwardly extending arm and extending longitudinally along the spoke, a second electrically conductive strip on said downwardly extending arm and extending longitudinally along the spoke; a plurality of first wires extending between said spokes, said first wires being mutually spaced and connected to said first electrically conductive strips; a plurality of second wires extending between said spokes, said second wires being mutually spaced and connected to said second electrically conductive strips; and means connecting said source of periodically occurring voltage pulses to said first and second electrically conductive strips for establishing periodic pulses of electric field across said first and second wires so that some of the air molecules in proximity with said first wires are ionized and unipolar ions accelerated along electric field lines between said electrodes toward said second wires and collide with air molecules to provide aerodynamic thrust for the vehicle, both functions realized without encountering low impedance breakdown of the gas between the electrodes.

References Cited
UNITED STATES PATENTS

| | | |
|---|---|---|
| 2,809,314 | 10/1957 | Herb. |
| 2,949,550 | 8/1960 | Brown. |
| 2,958,798 | 11/1960 | Anton _____ 313—54 |
| 3,071,705 | 1/1963 | Coleman et al. _____ 60—202 |
| 3,120,363 | 2/1964 | Hagen _____ 244—62 |
| 3,130,945 | 4/1964 | De Seversky _____ 244—62 |
| 3,177,654 | 4/1965 | Gradecak _____ 60—202 |
| 3,212,442 | 10/1965 | Jorgenson et al. |
| 3,223,038 | 12/1965 | Bahnson _____ 60—202 |
| 3,278,789 | 10/1966 | Shroff _____ 313—346 |

CARLTON R. CROYLE, Primary Examiner

U.S. Cl. X.R.

230—69; 60—204, 228; 244—62; 313—54, 63, 311, 355